United States Patent
Huntsman et al.

(10) Patent No.: US 8,059,799 B1
(45) Date of Patent: Nov. 15, 2011

(54) ALGORITHM TO MAKE OPTIMAL USE OF NETWORK RESOURCES DURING A MASS CALLING EVENT

(75) Inventors: Russell E. Huntsman, Overland Park, KS (US); Eric Bloomcamp, Olathe, KS (US); Jeffery O. Green, Lee's Summit, MO (US); Pierce Gorman, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1125 days.

(21) Appl. No.: 11/840,044

(22) Filed: Aug. 16, 2007

(51) Int. Cl.
*H04M 15/10* (2006.01)

(52) U.S. Cl. .............. 379/112.05; 370/218; 370/230; 370/352; 370/356; 370/395.21; 379/115.01; 379/133; 379/134; 379/221.08; 455/417; 709/224; 726/23

(58) Field of Classification Search .......... 370/218, 370/230, 233, 352, 356, 395.21, 235, 395.2; 379/112.05, 115.01, 133, 134, 221.08; 455/417; 709/224; 726/23
See application file for complete search history.

(56) References Cited

U.S. PATENT DOCUMENTS

| | | | | |
|---|---|---|---|---|
| 4,191,860 A | * | 3/1980 | Weber | 379/115.01 |
| 5,778,057 A | * | 7/1998 | Atai | 379/221.08 |
| 5,864,611 A | * | 1/1999 | Ching et al. | 379/134 |
| 5,878,224 A | * | 3/1999 | Smith | 709/224 |
| 5,923,742 A | * | 7/1999 | Kodialam et al. | 379/133 |
| 6,603,851 B1 | * | 8/2003 | Smith et al. | 379/221.08 |
| 7,002,915 B1 | * | 2/2006 | Huberman et al. | 370/233 |
| 7,124,440 B2 | * | 10/2006 | Poletto et al. | 726/23 |
| 7,139,238 B2 | * | 11/2006 | Hwang | 370/218 |
| 7,453,803 B1 | * | 11/2008 | Bugenhagen | 370/230 |
| 7,522,608 B2 | * | 4/2009 | Samdadiya et al. | 370/395.21 |
| 7,760,639 B2 | * | 7/2010 | Donovan et al. | 370/235 |
| 2007/0070989 A1 | * | 3/2007 | Savoor et al. | 370/356 |
| 2009/0047939 A1 | * | 2/2009 | Jrad et al. | 455/417 |
| 2009/0168765 A1 | * | 7/2009 | Samdadiya et al. | 370/352 |

* cited by examiner

*Primary Examiner* — Gerald Gauthier (57) ABSTRACT

Embodiments of the present invention provide methods, systems, and computer-readable media for achieving a higher call completion rate in a system experiencing a mass calling event. The present invention has several practical applications in the technical arts including optimizing use of network resources during a mass calling event. In various embodiments, a network's resources are efficiently utilized by way of sampling a network element's control processing unit utilization. Additionally, the various embodiments respond by selecting to negatively acknowledging callers in a mass calling event state in order to prevent system components from becoming overloaded. Overloaded network system components lead to such issues as dropped signaling packets, and higher percentages of call failures. Embodiments of the invention are directed to achieving optimal call completion in the case of a mass calling event.

20 Claims, 6 Drawing Sheets

ALGORITHM TO MAKE OPTIMAL USE OF NETWORK RESOURCES DURING A MASS CALLING EVENT

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

This summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

Embodiments of the present invention are directed to increasing a network's resource efficiency in the case of a mass calling event (MCE) by negatively acknowledging ("nacking") a percentage of call attempts. The present invention has several practical applications in the technical arts including optimizing use of network resources and increasing call completion during mass calling events, created, for example, during radio events or widely televised events that require viewers to actively participate by calling an end user or end line.

In one embodiment of the present invention, a computerized method achieves optimal call completion during a MCE state. The computerized method includes but is not limited to computer executable instructions either implemented by a user or software component. The computerized method samples a network component's control processing unit (CPU) utilization to calculate a nack rate. The sampling includes continuously or periodically sampling the CPU utilization. After calculating a nack rate, it is used to determine the number of new callers to nack to result in a higher call completion rate.

In another embodiment of the present invention, one or more computer-readable media embodying instructions for performing a method of identifying a MCE and nacking callers during the MCE state. This embodiment of the present invention includes computer-useable instructions to identify a MCE, to determine at least once a nack rate based on the CPU utilization, and nacking a percentage of calls or callers. Nacking a percentage of calls or callers is based on the determined nack rate. Another embodiment in accordance with the present invention includes a minimum nack threshold that can either be configured or predetermined at the start of the computer-useable instructions. Additionally, this embodiment of the present invention includes continuing to nack until the determined current nack rate falls below the minimum nack threshold.

Yet a further embodiment of the present invention includes one or more computer-readable media embodying instructions for performing a computerized method to nack call attempts in the case of a MCE. This embodiment of the present invention includes computer-useable instructions, and determining CPU utilization by sampling the CPU utilization. Sampling the CPU utilization can either occur periodically without user input, by a user specified period of time, or with an administrator's instructions to sample the CPU. The embodiment of the computerized method also calculates a nack rate and nacks a percentage of calls or callers based on the nack rate. Additionally, the embodiment of the present invention also determines a new nack rate and nacks a percentage of calls or callers based on this new negative acknowledgement rate.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps unless disclosed herein and except when the order of individual steps is explicitly described.

It should be understood that the arrangements described herein are set forth only as examples. Other arrangements and elements (e.g., cables, networks, machines, interfaces, functions, orders, and grouping of functions, etc.) can be used in addition to or instead of those shown and some elements may be omitted all together. Further, many of the elements described herein are functional entities and may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Embodiments of the present invention provide methods, systems, and computer-readable media for achieving a higher call completion rate in a system experiencing a mass calling event. In various embodiments, the a network's resources are efficiently utilized by way of sampling various network resource utilizations and responding accordingly in a MCE state.

The present invention has several practical applications in the technical arts including optimizing use of network resources during a MCE, for example, during radio events or widely televised events that require viewers or listeners to call in at one time. One example of a MCE is users or callers voting for their favorite singer in American Idol. In this scenario, problems arise when many callers attempt to place a call at a common time. In particular, system components become overloaded and are forced to abort many callers in an attempt to adequately and efficiently use the network's resources. Thus, there is a high rate of aborted callers since a network's resources are heavily weighed down. Embodiments of the invention are directed to achieving optimal call completion in the case of a MCE.

In various aspects, a telephone caller will use a network-based call signaling system (NCS), Session Initiation Protocol (SIP), or other such telecommunication system to place a telephone call. A caller is then negatively acknowledged (nacked) in order to increase the network's resource efficiency and achieve optimal call completion. This nack causes either new calls to be aborted or causes a conditioned response to be sent to a caller. These reactions occur before a system uses substantial network resources to continue call establishment. An aborted or conditioned response can consist of a dial tone, a busy signal, a long waiting period, or some other type of audio file sent to a caller. A nack rate is used to track the percent or amount of callers that are cut off or aborted in each case of a mass calling event. Embodiments of the invention employ control processing unit (CPU) utilization sampling of a network component to identify a MCE and determine a nack rate at which to abort callers while resourcefully utilizing the network resources. Accordingly, embodiments of the present invention are directed to effectively utilizing a network's resources to optimize call completion. The end result is a higher call completion rate for a telecommunication system than is currently available.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in natures, as are means of communicating with the same. By way of example, and not limitation, computer-readable media comprises computer-storage media and/or any method or technology for storing information.

Computer-storage media, or machine-readable media, include media implementation in any method or technology for storing information. Examples of stored information include computer-useable instructions, data structures, program modules, and other data representations. Computer-storage media include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
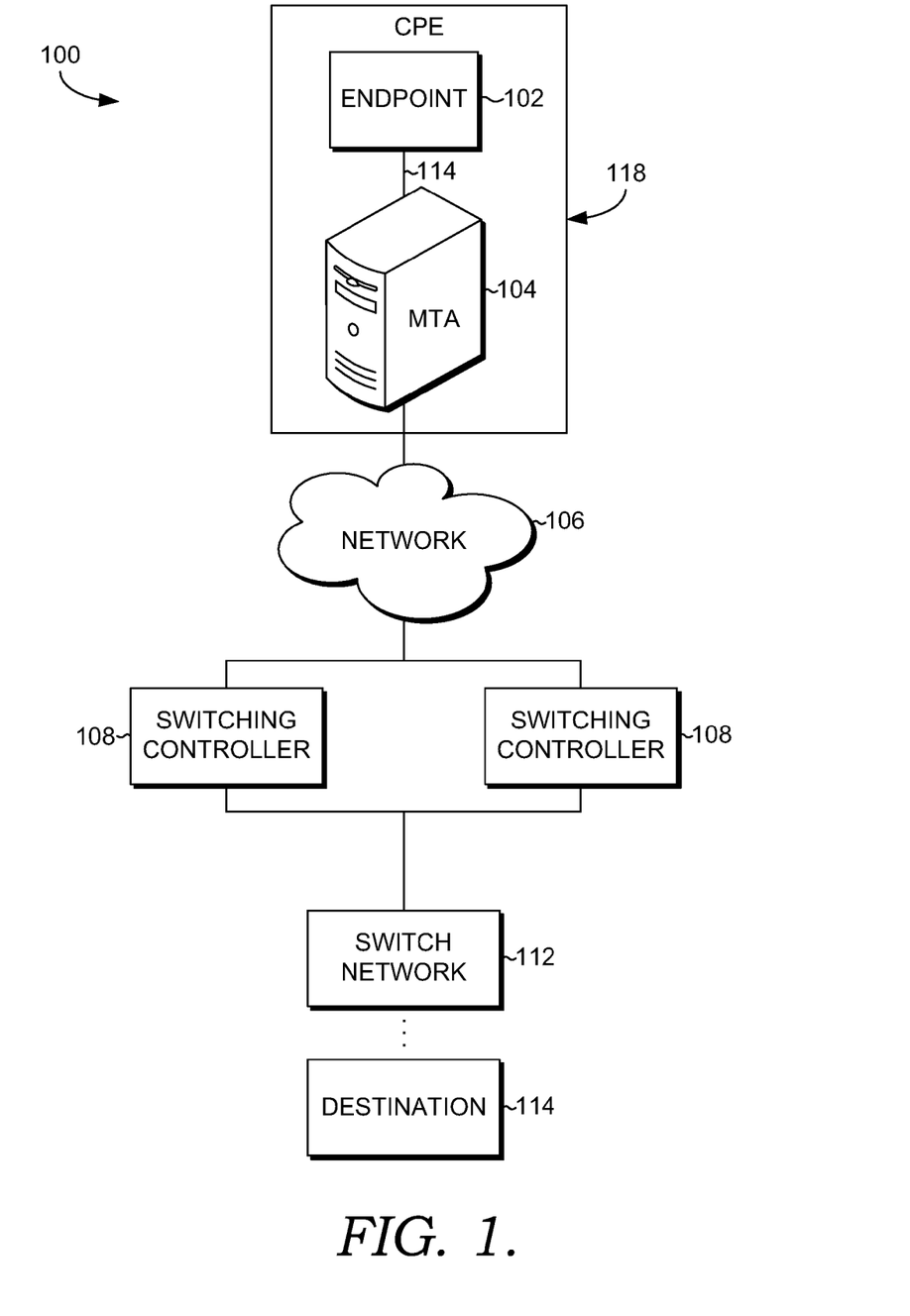
FIG. 1 is a block diagram of an exemplary system architecture suitable for use in implementing an embodiment of the present invention.

Referring now to FIG. 1, a block diagram is provided illustrating an exemplary system 100 in which embodiments of the invention may be employed. The system 100 comprises telecommunication systems such as a network-based call signaling system. The system 100 may include long-range communications or short-range communications to establish and engage in communication. The system 100 may include a wireless option that includes an RF interface. The wireless option in the system 100 may both transmit and receive RF signals over short-range or long-range communications. The communication in the system 100 may also occur in digital format.

The system 100 shown in FIG. 1 is one example of a system in which embodiments for achieving optimal call completion in the present invention may be employed but is not limited to just this system. The system 100 can encompass one or more other systems to complete a larger communications system. Other such examples of communication systems included but are not limited to the following: broadband telephony, IP telephony, public switched telephone network, private switched telephone network, etc. As shown in FIG. 1, customer premises equipment (CPE) 118 serves as the beginning source of a phone call, where one or more endpoints 102 represent potential customers, telephones, cell phones, etc. Among other components not shown, a multimedia terminal adapter (MTA) is included within the CPE 118 and generally includes a processor, memory, a personal area network component, and/or wireless communications component to transmit data signals to the network 106. The endpoint 102 and MTA 104 are generally located within the same area (e.g., a customer's home or business). From the endpoint 102, the call gets routed to an enhanced multimedia terminal adapter (MTA) 104. The link 114 used to connect the MTA 104 and the endpoint 102 may be wired or wireless. Additionally, the MTA 104 may include an interface device to the network 106 and a power source (e.g., a battery) or cabling to connect the unit to a power source. The MTA 104 sends information to a network 106, where the network 106 encompasses a cable network and Internet network. The network 106 may include one or more wide area networks (WANs) and/or one or more local area networks (LANs), as well as one or more public networks such as the Internet, and/or one or more private networks. The network 106 may also include one or more servers. From the network 106, information packets are sent to one or more switching controllers 108, which are also known as session border controllers (SBCs).

The purpose of the switching controllers 108 are to exert control over the signaling and information packets involved in setting up, conducting, and tearing down calls. The system 100 uses the switching controllers 108 to allow calls to be set-up within the endpoint 102 and the destination 114. The switching controllers 108 manage the flow of data or information packets across network elements and modify the stream of signaling involved in each call. The switching controllers 108 also provide strong security measures that are necessary to maintain a high quality of communication service possibly limiting the types of calls conducted, changing a call choice, etc. The switching controllers 108 are located within the signaling paths between the endpoint 102 and the destination 114. In some embodiments of present invention, a software algorithm is implemented on one of these controllers 108 to identify a MCE state and to nack calls to achieve optimal call completion. However, the algorithm can be implemented on any component within a communication system that becomes overloaded during a MCE.

From the switching controllers 108, information is sent to a switching network 112 wherein the switching network 112 receives packets of information to direct a phone call to the correct destination 114. The path between the switch network 112 and the destination 114 represents additional network elements not depicted in the figure or elements already illustrated in the figure. The destination 114 can either be another endpoint, telephone, customer, computer system, cell phone, etc. As mentioned previously, the computerized method implementation is not limited to the switching controllers 108 and embodiments of the present invention, but rather the computerized method can be implemented on any of the elements with the system 100. Depending on the complexity of the communications system 100 or any implemented communications system, the system 100 in FIG. 1 may include only a portion of the components shown and/or may include additional components not shown. Although this is one example of a system to implement an embodiment of the present invention, it should be noted that the embodiments of the invention should not be limited to this one example of a communications system.

Figure 2:
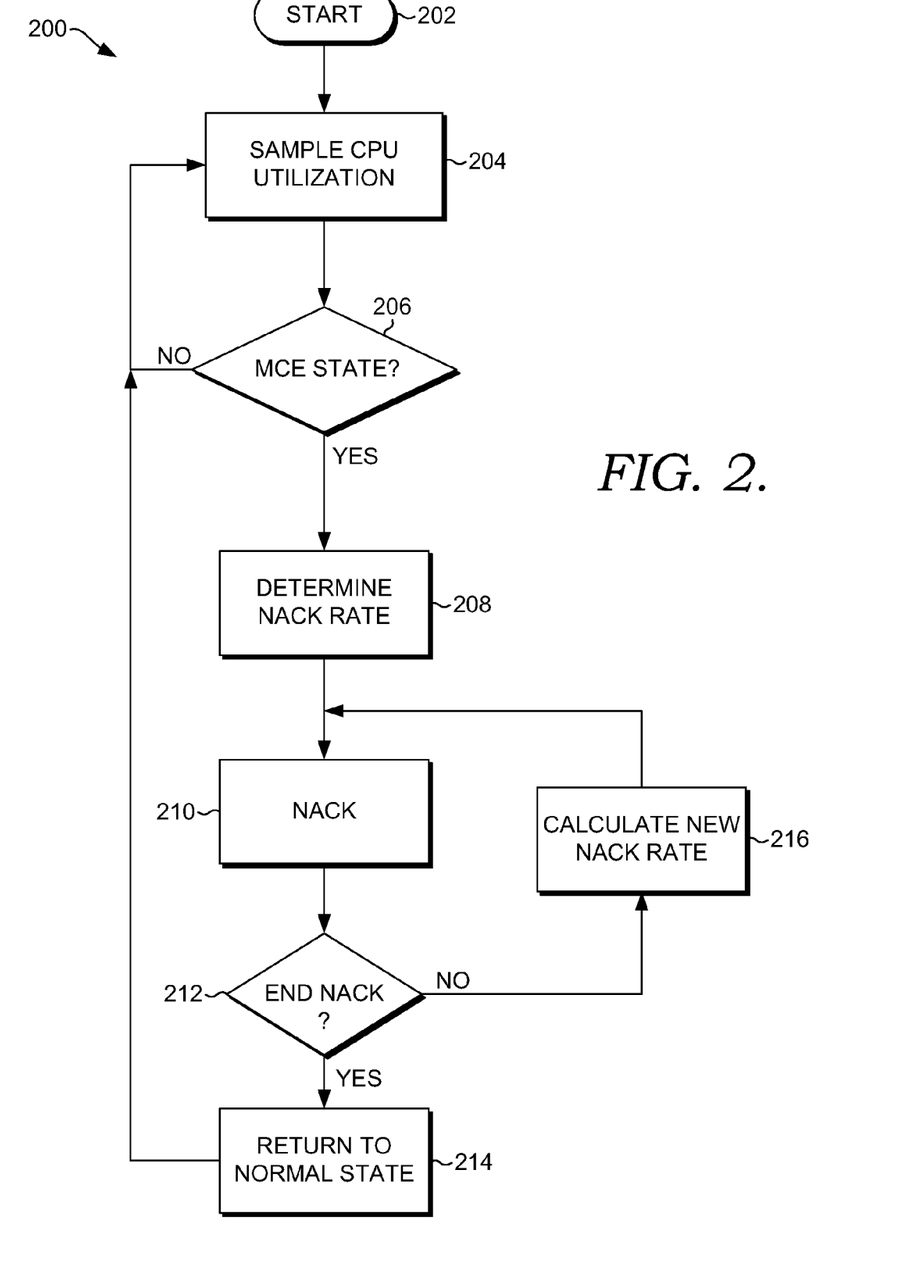
FIG. 2 is a flow diagram showing a method for nacking calls in accordance with an embodiment of the present invention.

FIG. 2 is a flow diagram illustrating a method for optimizing use of network resources by nacking calls during a MCE state in accordance with an embodiment of the present invention. Typically, the method 200 may be implemented by a session border controller (SBC) such as the switching controller 108 of FIG. 1, but may also be implemented on other components in various embodiments of the invention. The method 200 begins at start at block 202 wherein any configurations or predetermined factors are presented and implemented at this point. From there, the control processing unit (CPU) utilization for a network component is sampled, as shown at block 204. Sampling can either occur continuously or a specified period. For instance, sampling can occur every few milliseconds or for longer periods of time such as every 10 seconds. Sampling the CPU utilization can also occur according to a predetermined period of time implemented at start or can be sampled according to an administrator's or programmer's need to sample the CPU utilization. The sampled CPU utilization is used to determine whether a telecommunications system is currently in a MCE state as shown at block 206.

A MCE is a mass calling event state wherein there is an over abundance of callers or customers overloading the CPU utilization and adversely effecting network resources. An example of a mass calling event would be American Idol where viewers call in to a system at a given time to vote on their favorite singer. A further example would include a radio show that has a plethora of listeners calling in at one time for a prize or to speak to a radio show host. Since many callers are trying to call one destination, this qualifies as a MCE. A MCE could also occur if callers are attempting to reach different destinations at a common time. During a MCE, several network resources such as CPU maximum operation levels and network bandwidth levels are pushed to their respective threshold levels or upper limits, thus slowing a system. One embodiment of determining a MCE, entails comparing the sampled CPU utilization to a predetermined CPU threshold level. Once the CPU utilization exceeds the predetermined threshold level, a system is deemed to be in a MCE state. Another embodiment determining a MCE additionally uses an average CPU utilization as shown in FIG. 3.

Figure 3:
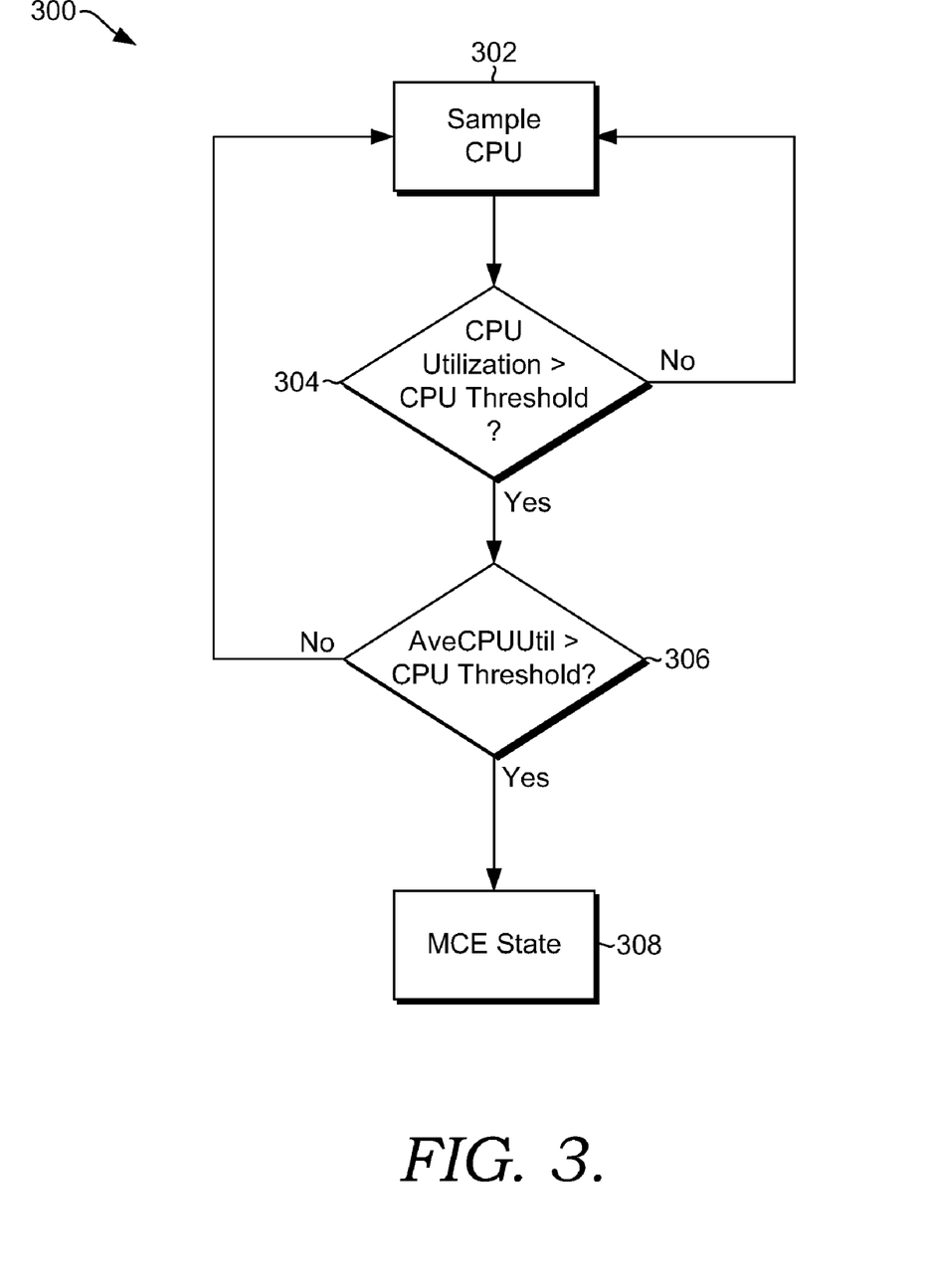
FIG. 3 is a flow diagram showing a method for determining a mass calling event state in accordance with an embodiment of the present invention.

One embodiment of using an average CPU utilization, sampled CPU utilization, and CPU threshold to determine a MCE state is seen in FIG. 3. The method 300 starts sampling a CPU utilization as shown in block 302. Sampling the CPU utilization can either occur continuously, every few milliseconds, or for longer periods of time such as every 10 seconds. Sampling the CPU can also occur according to a predetermined period of time implemented at the start of the software algorithm or can be sampled according to an administrator's or programmer's need to sample the CPU utilization. The CPU utilization is compared against a predetermined CPU threshold, as shown at block 304. The CPU threshold level is a predetermined level that is used as an indication of a possible MCE. If the CPU utilization is less than the CPU threshold, the system remains in a normal state and continues sampling the CPU utilization. If the sampled CPU utilization exceeds the CPU threshold, the method moves on to determining whether the average CPU utilization over a given sampling period is greater than the CPU threshold at block 306. If the average CPU utilization exceeds the CPU threshold then a system is determined to be in a MCE state, as shown at block 308. Accordingly, if the CPU sampling rate is above the CPU threshold level but the average CPU utilization is not, the MCE state will not be entered. If the reverse is true, and the average CPU utilization is higher than the CPU threshold level but the threshold is not higher than the CPU sampling rate, the mass calling event will not be entered and both paths lead to a system in a normal state. Both the CPU sampling rate and the average CPU utilization must exceed the CPU threshold in order to enter a MCE in this embodiment. This prevents nacking new calls due to manageable, higher spikes over the threshold. Depending on the complexity of the method start, FIG. 3 may include only a portion of the steps and/or blocks shown and/or may include additional steps and/or blocks not shown.

Returning again to FIG. 2, if a system is not in a state of a MCE, the system is considered to be in a normal state. A normal state is considered one where a system continues to sample network resources and is not in a state of a MCE. Alternatively, if a MCE state is determined, a nack rate is determined at block 208. In an embodiment, a nack rate is determined from the network resource sampling. More particularly, the nack rate is based on the extent to which the CPU utilization exceeds the CPU threshold, such as shown in the following equation:

$$newCalcNackRate = \frac{(CPUSampledRate - CPUThreshold)}{(100 - CPUThreshold)}$$

For example, if the threshold is 90% and the current CPU utilization is 95%, the new calculated nack rate is 50%.

A nack rate is used to track off hook events to cause new calls to be aborted before using substantial network resources to continue call establishment. In a MCE state, a nack rate is used to nack callers by such methods as aborting a call. Such methods of nacking include but are not limited to aborting the call, sending a preconfigured message to caller, sending a preconfigured audio file to caller, sending a SIP nack or sending a NCS 403 conditioned response to a caller. The details pertaining to a 403 response are discussed later in this section.

Once a system begins nacking excess callers, it enters a state of determining whether to continue nacking or to end nacking as shown in block 212. Once a system ends nacking, it will return to a normal state as seen in block 214 and continue to sample CPU utilization to identify future MCE states. If a system continues nacking, a new nack rate is calculated as shown in block 216. New nack rates may be calculated in a number of different ways in various embodiments of the invention. By way of example only and not limitation, a new nack rate may be determined based on the current CPU utilization. In other embodiments, a new nack rate may be calculated by reducing the previous nack rate by a decay rate. In still further embodiments, a new nack rate may be determined using both current CPU utilization and a decay rate, such as that shown in FIG. 4.

Figure 4:
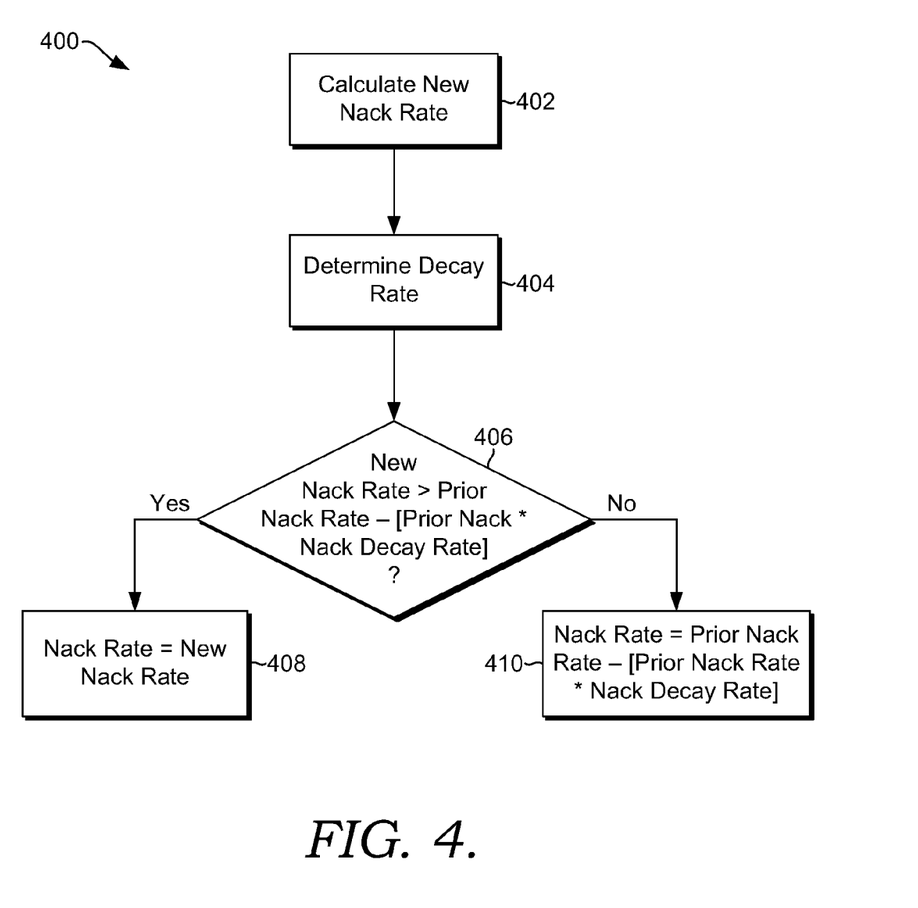
FIG. 4 is a flow diagram showing a method for calculating a nack rate based on prior nack rates and decay rates in accordance with an embodiment of the present invention.

One embodiment of calculating a proficient nack rate is seen in FIG. 4. In the embodiment, a new nack rate is calculated based on either a decay rate or based on the current CPU utilization. Initially, a new nack rate is calculated based on current CPU utilization as shown at block 402. Additionally, the method 400 determines the decay rate at block 404.

In the embodiment depicted in FIG. 4, the nack decay rate is a predetermined percent of the current nack rate to decrease. The method 400 compares the newly calculated nack rate to the prior nack rate and the decay rate at block 406. If the new nack rate is the greater of the two numbers, the nack rate is set at the new nack rate as shown at block 408. If the new nack rate is the lesser of the two numbers, the method determines the prior nack rate reduced by the decay rate to be the current nack rate as shown at block 410. The method 400 determines the best nack rate to achieve optimal call completion during a mass calling event. Depending on the complexity of the method 400, FIG. 4 may include only a portion of the steps and/or blocks shown and/or may include additional steps and/or blocks not shown.

Returning back to FIG. 2, calculating a new nack rate as shown in block 216 ensures a system continues to nack excess callers as shown at block 210. Once a system begins nacking excess callers, it enters a state of determining whether to continue nacking or to end nacking as shown in block 212. To determine whether to terminate nacking can be accomplished through a variety of embodiments. In one embodiment of the method to end nacking, depends on a time based predetermined interval configured at the start of a software algorithm. In another embodiment, nacking is ended after the CPU utilization decreases to specific level. In yet another embodiment of determining to end the state of nacking can be reached by configuring a minimum nack rate. This embodiment is show in FIG. 5.

Figure 5:
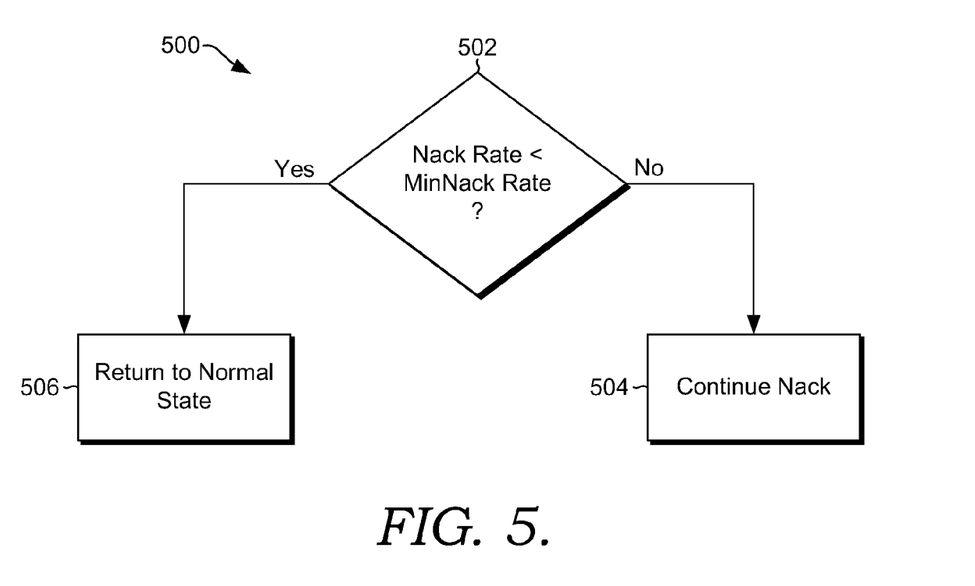
FIG. 5 is a flow diagram showing a method for determining whether to end nacking calls in accordance with an embodiment of the present invention.

One embodiment of determining to end a nack is seen in FIG. 5. The method 500 presents a comparison between a minimum nack rate and a current nack rate at block 502. The minimum nack rate is configured at the start of a method 500 or beginning of a software algorithm 500. If the lesser of the two numbers is the nack rate, a system returns to a normal state at block 506. The normal state is where a system continuously samples or periodically samples a network's resources. The minimum nack rate is the minimum level nack rate so that if the nack rate falls below this level, the nack will discontinue. If the lesser of the two numbers is the minimum nack rate the method 500 will continue to nack callers at block 504 until the method returns to a normal state. The normal state is dependent on the MCE state. A normal state is considered to not be in a MCE. For example, if the minimum nack rate is 5% and the nack rate is 4%, no nacking will occur and the method returns to a normal state. Depending on the complexity of the method 500, FIG. 5 may include only a portion of the steps and/or blocks shown and/or may include additional steps and/or blocks not shown.

Figure 6:
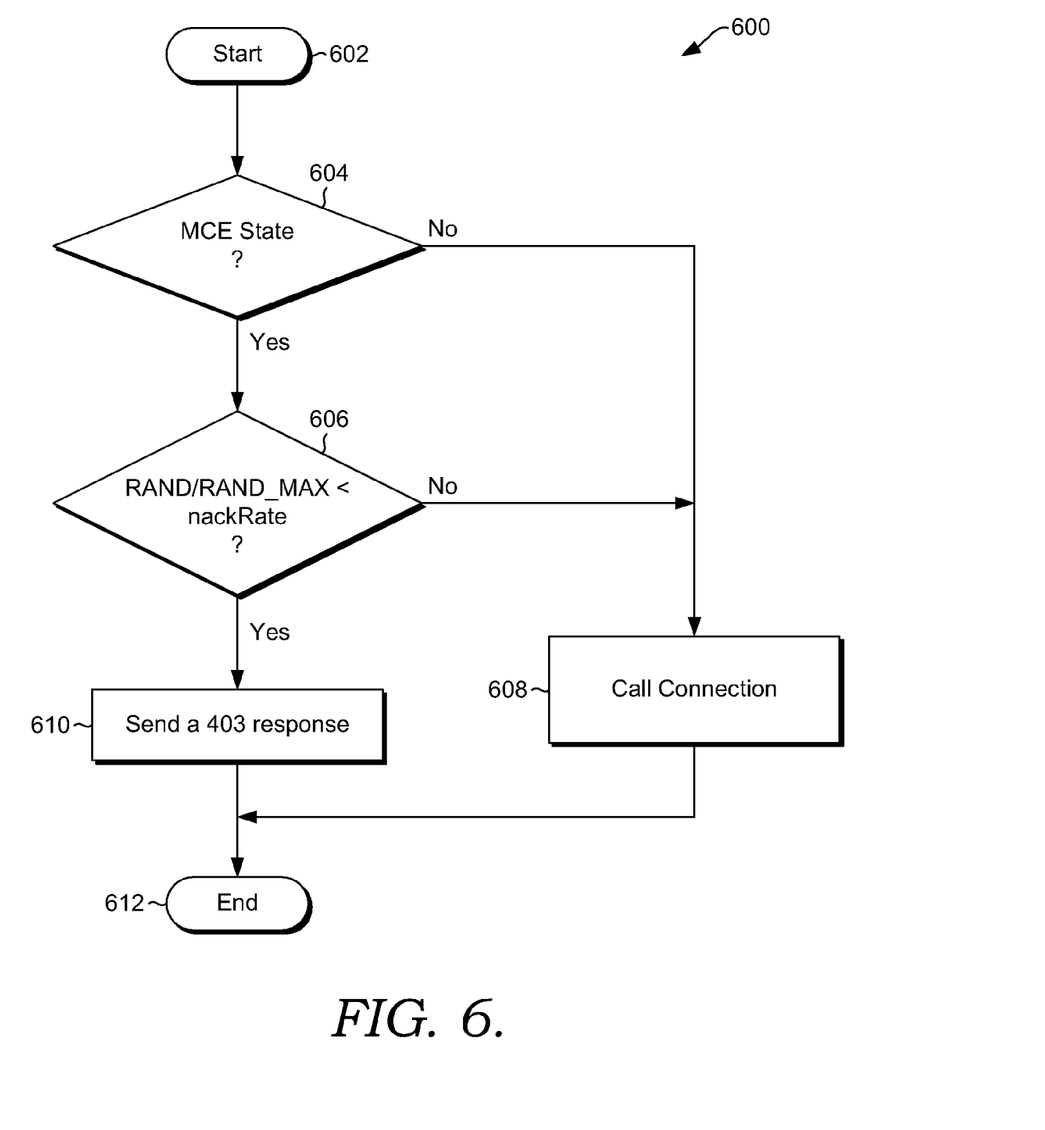
FIG. 6 is a flow diagram showing a method for determining the occurrence of a MCE and the response to a caller in accordance with an embodiment of the present invention.

One embodiment of determining the occurrence of a mass calling event and a response to a user is presented in FIG. 6. The method 600 begins at block 602 where the necessary variables and values are configured. The method 600 moves on to determining whether a system is in a MCE state as shown in block 604. If the system is not in a MCE state, a call connection is made to complete a call at block 608. Once determining that a system is in a MCE state, the calculated nack rate should be applied fairly to all endpoints to prevent starving individual endpoints. One option to achieve fairness is shown in block 606. A randomly generated number is divided by the maximum possible random number. This ratio is then compared to the nack rate. If the random ratio is below the nack rate we move to block 610. The current call attempt is sent a nack, in this example a 403 response, to abort the call attempt. Such examples include but are not limited to aborting the call, sending a preconfigured message to caller, sending a preconfigured audio file to caller, sending a SIP nack, or sending a 403 conditioned response to a caller. The chosen implementation uses a 403 response to an endpoint. Upon receipt of the 403 response, an MTA accepts the messages as being nacked and ceases any retransmission of that message as shown in block 612. No further call creation occurs at that point. If, however, the random rate calculated in block 606 is greater than the nack rate, the call attempt is allowed to progress to block 608 for normal call completion. Depending on the complexity of the method 600, FIG. 6 may include only a portion of the steps and/or blocks shown and/or may include additional steps and/or blocks not shown.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:
CPU Control Processing Unit
LAN Local Area Network
NCS Network-based Call Signaling System
NACK Negative Acknowledgement Rate
MTA Enhanced Multimedia Terminal Adapter
MCE Mass Calling Event
RF Radio Frequency
SBC Session Border Controller
SIP Session Initiation Protocol
WAN Wide Area Network Further, various technical terms are used throughout this description. An illustrative resource that fleshes out various aspects of these terms can be found in *Newton's Telecom Dictionary* by H. Newton, $22^{nd}$ Edition (2006).

Conclusion

As can be seen, embodiments of the present invention relate to an algorithm to achieve optimal call completion during a MCE. Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computerized method to achieve optimal call completion in the case of a mass calling event, the method comprising:
   sampling a control processing unit (CPU) utilization;
   calculating a negative acknowledgement rate based on the sampled CPU utilization; and
   negatively acknowledging a percentage of call attempts based on the calculated negative acknowledgement rate.

2. The method of claim 1, wherein negatively acknowledging a percentage of call attempts to achieve optimal call completion comprises at least one of the following: aborting a call, sending a preconfigured message to a caller, sending a preconfigured audio file to a caller, sending a SIP nack, and sending a 403 conditioned response to a caller.

3. The method of claim 1, wherein the negative acknowledgement rate is calculated based on an extent to which the CPU utilization exceeds a CPU threshold level.

4. The method of claim 3, wherein the negative acknowledgement rate is calculated according to the following formula: NackRate=(CPUSampledRate−CPUThreshold)/(100−CPUThreshold), wherein NackRate is the negative acknowledgment rate, CPUSampledRate is the CPU utilization and CPUThreshold is the CPU threshold level.

5. The method of claim 1, further comprising determining a mass calling event.

6. The method of claim 5, wherein determining the mass calling event comprises comparing the CPU utilization against a CPU threshold level.

7. The method of claim 6, wherein determining the mass calling event further comprises determining an average CPU utilization and comparing the average CPU utilization against the CPU threshold level.

8. The method of claim 1, wherein the method further comprises calculating a new negative acknowledgement rate based on at least one of: a new sampled CPU utilization; and a previous negative acknowledgement rate reduced by a negative acknowledgment decay rate.

9. The method of claim 8, wherein the method further comprises negatively acknowledging a percentage of call attempts based on the new negative acknowledgment rate.

10. The method of claim 1, further comprising repeatedly determining further negative acknowledgment rates until a further negative acknowledgement rate is below a minimum negative acknowledgement rate.

11. One or more computer-readable media embodying computer-useable instructions for performing a computerized method to negatively acknowledge call attempts in the case of a mass calling event, the method comprising:
   determining CPU utilization;
   calculating a negative acknowledgement rate;
   negatively acknowledging a percentage of call attempts based on the negative acknowledgement rate;
   determining a new negative acknowledgement rate; and
   negatively acknowledging a percentage of call attempts based on the new negative acknowledgement rate.

12. The one or more computer-readable media of claim 11, wherein negatively acknowledging a caller comprises at least one of the following: aborting a call, sending a preconfigured message to a caller, sending a preconfigured audio file to a caller, and sending a 403 conditioned response to a caller.

13. The one or more computer-readable media of claim 11, wherein the negative acknowledgement rate is calculated based on an extent to which the CPU utilization exceeds a CPU threshold level.

14. The one or more computer-readable media of claim 11, wherein the negative acknowledgement rate is calculated according to the following formula: NackRate=(CPUSampledRate−CPUThreshold)/(100−CPUThreshold), wherein NackRate is the negative acknowledgment rate, CPUSampledRate is the CPU utilization and CPUThreshold is the CPU threshold level.

15. The one or more computer-readable media of claim 11, further comprising determining a mass calling event.

16. The one or more computer-readable media of claim 15, wherein determining the mass calling event comprises comparing the CPU utilization against a CPU threshold level.

17. The one or more computer-readable media of claim 16, wherein determining the mass calling event comprises determining an average CPU utilization and comparing the average CPU utilization against the CPU threshold level.

18. One or more computer-readable media embodying computer-useable instructions for performing a method of negatively acknowledging call attempts during a mass calling event, the method comprising:
   identifying a mass call event; and
   repeatedly determining a negative acknowledgment rate based at least in part on a current CPU utilization and negatively acknowledging a percentage of call attempts based on the negative acknowledgement rate until the negative acknowledgement rate falls below a minimum negative acknowledgment rate threshold.

19. The one or more computer-readable media of claim 18, wherein repeatedly determining a negative acknowledgement rate comprises: determining a first negative acknowledgement rate based on a current CPU utilization; determining a second negative acknowledgement rate based on a previous negative acknowledgement and a negative acknowledgement decay rate; and setting the negative acknowledgement rate as the greater of the first and second negative acknowledgement rates.

20. The one or more computer-readable media of claim 19, wherein the first negative acknowledgement rate is calculated according to the following formula: NackRate=(CPUSampledRate−CPUThreshold)/(100−CPUThreshold), wherein NackRate is the first negative acknowledgment rate, CPUSampledRate is the current CPU utilization and CPUThreshold is a CPU threshold level.

* * * * *